Patented July 19, 1938

2,124,151

UNITED STATES PATENT OFFICE 2,124,151

SYNTHETIC RESINS

Henry S. Rothrock, Wilmington, Del., assignor to E. I. du Pont de Nemours & Company, Wilmington, Del., a corporation of Delaware No Drawing. Application May 1, 1936, Serial No. 77,452

4 Claims. (Cl. 260—2)

This invention relates to synthetic resins, and more particularly to new resins made from urea and higher aldehydes.

Soluble urea-formaldehyde resins, as is well known, can be easily prepared by condensing the reactants in either aqueous or organic solvents in the presence of a catalyst. Although the term "aldehyde" is generally used in the extensive patent and non-patent literature on urea-aldehyde resins, the aldehyde specifically mentioned and used, in most of these references, is formaldehyde or formaldehyde in conjunction with another aldehyde or other reactant. The reason for designating formaldehyde in all instances where a resinous and soluble product is desired resides in the fact that it is well known to those skilled in the art that a higher aldehyde cannot simply be substituted as an equivalent in the various known processes using formaldehyde because the nature of the product obtained is entirely different. Thus, in Beilstein (vol. 3) is described the reaction at room temperature of higher aldehydes with urea, but in all instances non-resinous products are reported.

This invention has as an object the preparation of new and useful resinous compositions of matter. A further object is a process for making resins from urea and higher aldehydes which are heat-hardening, soluble in monohydric alcohols, and in mixtures of such alcohols with aromatic hydrocarbons and compatible with oil modified polyhydric alcohol-polycarboxylic acid resins. Other objects will appear hereinafter.

These objects are accomplished by the following invention which consists in heating urea and a saturated non-hydroxylated aliphatic aldehyde containing at least two carbon atoms with the observance of certain details of procedure described in detail below.

I have discovered that the higher aldehydes can be condensed with urea to form resinous products which are soluble in monohydric alcohols and mixtures thereof with aromatic hydrocarbons and compatible in practically all proportions with polyhydric alcohol-polycarboxylic acid resins, provided the reaction is carried out in solution in a monohydric alcohol at temperatures above 50° C. but not substantially higher than 100° C. and in the absence of strong acid or basic catalysts. Traces of weak organic acids generally present in aldehydes are not disadvantageous. The desired reaction product is not produced in the presence of the usual basic or strong acid catalyst or of substantial proportions of water. For example, if a resin is prepared in the presence of catalytic proportions of hydrochloric acid or of sodium hydroxide, the solutions are unstable and insoluble solids separate from them on cooling and standing. If the resin is made in the absence of such catalysts, the solutions remain clear and homogeneous indefinitely, and films prepared from them are likewise clear and homogeneous. It will be observed that these rigid requirements are in sharp contrast with those for making resins from formaldehyde and urea, since soluble resins of the latter type are easily made by condensing the reactants with acid or alkali condensing agents in either aqueous or organic solvents. In the present process if the alcohol is omitted, or if other types of solvents or aqueous alcohol is used, the products are either non-resinous, as reported in the literature, or they are insoluble in organic solutions and incompatible with the oil modified polyhydric alcohol-polybasic acid resins.

In carrying out my invention the urea and higher aldehyde, e. g., propionaldehyde, or other aliphatic aldehyde having at least two carbon atoms, is heated with the desired monohydric alcohol at an elevated temperature, preferably 50° C. to 100° C., until a flowout of the reaction mixture dries upon heating for a few minutes at about 100° C. to a clear, homogeneous film, indicating that complete reaction has occurred. The reaction mixture can then be used directly as a coating composition, or it can be blended with solutions of oil modified polycarboxylic acid-polyhydric alcohol resins to form coating compositions, or the solid resin may be isolated by evaporation of the solvent, provided care is taken to prevent heat-hardening or insolubilization of the resin by use of too high a temperature. The resins described herein resemble other urea-aldehyde resins in becoming insoluble and infusible upon heating. However, they can be isolated in soluble form by evaporating off the solvent at laboratory temperatures (about 25—30° C.), or by pouring the reaction mixture into some liquid which precipitates the resin, e. g., aliphatic hydrocarbons or water, filtering, and washing the precipitated resin and drying. It is usually safer (from the standpoint of solubility) and more convenient, however, to use the reaction mixture as such without attempting to isolate the resin.

The following examples are illustrative of the methods used in carrying out my invention:

*Example I*

A mixture of 12 grams (0.2 mol.) of urea and 55

20 grams of normal butanol was heated to refluxing. 11.6 grams (0.2 mol.) of propionaldehyde was added and refluxing was continued. After 20 minutes, all of the urea had dissolved. After the reaction mixture had refluxed for 30 minutes, it was cooled, and a portion was removed and used to cast a thin film on glass. This film was hard, clear, and colorless upon heating for a few minutes at about 100° C., and after heating for an hour was found to be insoluble in organic solvents and in water.

Portions of the cooled resin solution were diluted with equal volumes of toluol without precipitation of the resin, the solutions remaining clear.

4$\tfrac{1}{6}$ grams of a 50% toluol solution of a 45% castor oil modified polyhydric alcohol-polycarboxylic acid resin was mixed with 4.2 grams of the cooled resin solution (which contained 48.3% resin by weight). The clear mixed solution thus prepared contained equal parts by weight of the two resins. Flowouts of this solution on glass air-dried to a clear, homogeneous film.

4$\tfrac{1}{6}$ grams of a 50% solution in toluol of a 35% linseed oil modified polyhydric alcohol-polycarboxylic acid resin was mixed with 4.2 grams of the cooled resin solution. To the mixture was added 2 grams of butanol in order to clarify the solution. A film of this solution was clear and hard after baking at 100° C. for 15 minutes.

When Example I was repeated, adding small portions (2–3 drops) of either concentrated hydrochloric acid or 50% aqueous sodium hydroxide solution, the reaction proceeded rapidly to yield colored solutions from which only tacky, incompletely homogeneous films could be obtained either on baking or air-drying. These solutions were unstable, rapidly separating out insoluble, apparently non-resinous solids.

*Example II*

A mixture of 3 grams (0.05 mol.) of urea, 5.8 grams (0.1 mol.) of propionaldehyde (redistilled, B. P. 49–49.8° C.) and 20 grams of the monoethyl ether of ethylene glycol was heated under reflux for two hours. A clear, colorless reaction product was obtained. Films of the stable reaction mixture flowed on glass were clear, hard, and colorless, and upon baking at about 100° C. became insoluble in organic solvents and in water.

*Example III*

A mixture of 6 grams (0.1 mol.) of urea, 7.2 grams (0.1 mol.) of isobutyraldehyde and 40 grams of the monoethyl ether of ethylene glycol was warmed in a suitable reaction vessel to give a clear solution, which was then refluxed for 1¼ hours. Films cast from the resulting reaction mixture were clear and tack-free upon evapoporation of solvent at ordinary temperatures. The resin solution was heated at 100° C. for about sixteen hours to evaporate off the solvent. The residue was a yellowish resin which was soluble in the monoethyl ether of ethylene glycol but insoluble in butanol and toluene.

*Example IV*

A mixture of 3 grams (0.05 mol.) of urea, 11.4 grams (0.1 mol.) of heptaldehyde, and 10 grams of the monoethyl ether of ethylene glycol was heated at 80–100° C. for 25 minutes. Since the cooled solution was somewhat gelatinous, 10 grams of the monoethyl ether of ethylene glycol was added to make it clear and fluid. A mixture of this solution with a 50% toluene solution of a 45% castor oil modified polyhydric alcohol-polybasic acid resin was clear, and films flowed from the resin mixture were also clear. The films dried satisfactorily on baking at 100° C.

*Example V*

A mixture of 3 grams (0.05 mol.) of urea, 7.2 grams (0.1 mol.) of isobutyraldehyde, and 20 grams of the monoethyl ether of ethylene glycol was refluxed. Reaction was rapid as indicated by the fact that after two minutes' refluxing, only traces of urea crystals separated from the reaction mixture on drying a film thereof on glass. After refluxing the mixture for one hour, a film flowed on glass and dried was found to be tack-free. The solid resin obtained by evaporating off the solvent in vacuo at about 40° C. was soluble in alcohols such as the monoethyl ether of ethylene glycol and in butanol.

A solution was prepared containing equal parts by weight of the above resin and a 45% castor oil modified polycarboxylic acid-polyhydric alcohol resin dissolved in approximately equal parts (by weight) of the monoethyl ether of ethylene glycol and toluol. Films of this solution dried to tack-free, substantially colorless, hard films in air in approximately two days.

When Example V was repeated in the absence of solvent (monoethyl ether of ethylene glycol), the clear solution of urea in the isobutyraldehyde soon began to solidify and in a few minutes was completely solid. The product was not soluble in the monoethyl ether of ethylene glycol or in other organic solvents and was not compatible with the castor oil modified polycarboxylic acid-polyhydric alcohol resin described in the preceding paragraph. It is thus evident that in the absence of a monohydric alcohol, resins of the type described herein are not obtained.

The urea-higher aldehyde condensation products described herein are initially soluble in aliphatic monohydric alcohols and in mixtures thereof with aromatic hydrocarbons such as benzene, toluene, xylene, and mesitylene. They may become insoluble in such solvents if the reaction mixture is subjected to prolonged heating or even if the reaction mixture is heated at temperatures around 60–100° C. to evaporate the solvent. They remain soluble in the aforementioned solvents, however, if they are isolated from the reaction mixture at relatively low temperatures, or if they are precipitated therefrom by addition of a liquid such as an aliphatic hydrocarbon in which they are insoluble. As indicated in the examples, they can be blended with oil modified-polycarboxylic acid-polyhydric alcohol resins.

A suitable apparatus for carrying out the reactions described herein will be obvious to anyone skilled in the art. It is convenient to use a closed reaction vessel fitted with a reflux condenser and a stirring apparatus which will insure thorough mixing of the reacting ingredients.

Instead of the aldehydes mentioned in the examples I may use acetaldehyde, butyraldehyde, nonaldehyde or other saturated non-hydroxylated aliphatic aldehydes containing at least two carbon atoms. Aldehydes containing from two to seven carbon atoms in the molecule are preferred since, as the number of carbon atoms increases, the aldehyde becomes less reactive and the products less soluble in the alcohols used as solvents in the reaction. Aldehydes containing certain other substituent groups may also be employed in some cases.

The alcohols mentioned in the examples may be substituted wholly or in part by other readily volatile aliphatic alcohols such as ethanol, propanol, dodecyl alcohol, di-isopropyl carbinol or mixtures thereof with each other or with other monohydric alcohols, or with cycloaliphatic alcohols such as cyclohexanol. Relatively low boiling aliphatic or cycloaliphatic alcohols are preferred for economy as well as to facilitate removal of solvent by evaporation at reasonably low temperatures when the resin is to be isolated. The alcohol may be straight or branched chain and it may be primary or secondary, but primary alcohols are preferred. These alcohols include in general polyhydric alcohol in which all but one of the alcoholic hydroxyl groups has been etherified. The alcohol may also contain additional substituent groups or atoms which do not react with the urea or the aldehyde in the reaction mixture.

The reaction temperature should be kept as low as possible to avoid unnecessary insolubilization of the reaction products. The most convenient temperatures are the refluxing temperatures of the reaction mixtures when relatively low boiling alcohols and aldehydes are used. When higher boiling materials are employed, it is better to heat the reactants with stirring below the boiling point of the reaction mixture. The completion of the reaction can usually be determined by flowing films of the reaction mixture at intervals and observing whether crystals of the urea are present. When crystals no longer separate out from the reaction mixture on cooling, the reaction is substantially complete but if desired it may be carried further.

The proportions of reactants may be varied over considerable limits. An excess of aldehyde may be used, since any excess may be removed from the product. At least equimolar quantities of the urea and the aldehyde should be employed. Ordinarily the mol ratio of aldehyde to urea will not exceed 2:1. These proportions are not to be regarded as limiting my invention since I may use any proportions whatever.

Any convenient proportion of alcohol to the urea and the aldehyde can be employed. In general, there is no particular reason for using much more alcohol than is necessary to dissolve the reactants and the resinous condensation products thereof.

Enamels prepared by blending the new resins described herein with polyhydric alcohol-polycarboxylic acid resins are particularly valuable as metal protective finishes. My new resins are also useful as coating compositions for all sorts of surfaces, either alone or modified with natural or synthetic resins, especially oil modified polycarboxylic acid-polyhydric alcohol resins, cellulose derivatives, fatty oils, waxes, pigments, fillers, dyes, etc., or mixtures thereof. For example, such compositions may be used as coatings for textiles, paper, cloth, fabrics, wood, leather, metals (especially steel and other non-flexible surfaces), stone, brick, concrete, etc. The process described herein is highly useful for preparing a new series of urea-aldehyde resins which are soluble in certain common organic solvents and capable of being homogeneously blended with polycarboxylic acid-polyhydric alcohol resins.

The resins described herein are highly advantageous in comparison with ordinary urea-formaldehyde resins in that they can be blended with polycarboxylic acid-polyhydric alcohol resins to form useful coatings or films, and in that they are soluble in alcohols and aromatic hydrocarbons. Yet they retain the valuable property of urea-formaldehyde resins of becoming insoluble and infusible upon baking. They are also distinctly resinous materials whereas condensation products prepared from the same reactants in the absence of the solvents described herein are non-resinous, insoluble in alcohols and aromatic hydrocarbons, and do not blend with oil-modified polycarboxylic acid-polyhydric alcohol resins.

As many apparently widely different embodiments of this invention may be made without departing from the spirit and scope thereof, it is to be understood that I do not limit myself specifically to the embodiments thereof except as defined in the appended claims.

I claim:

1. A process for making resins which comprises heating from about 50° C. to about 100° C. in the absence of catalyst and in the absence of substantial amount of water and in the presence of a monohydric alcohol reactants consisting solely of urea and aldehyde consisting substantially wholly of a non-hydroxylated saturated aliphatic aldehyde containing at least two carbon atoms.

2. A process for making resins which comprises heating from about 50° C. to about 100° C. in the absence of catalyst and in the absence of substantial amount of water and in the presence of a monohydric alcohol reactants consisting solely of urea and a non-hydroxylated saturated aliphatic aldehyde containing from two to seven carbon atoms.

3. A composition of matter soluble in alcohols and in mixtures of alcohols with aromatic hydrocarbons and being the resinous reaction product of urea and aldehyde consisting substantially solely of a non-hydroxylated saturated aliphatic aldehyde containing at least two carbon atoms, said reaction product being that obtained by heating urea and said aldehyde from about 50° C. to about 100° C. in the absence of a catalyst and in the absence of substantial amount of water and in the presence of a monohydric alcohol.

4. The composition of matter defined in claim 3 wherein said aldehyde contains from two to seven carbon atoms.

HENRY S. ROTHROCK.